United States Patent [19]

Proctor, Jr. et al.

[11] Patent Number: 6,100,843

[45] Date of Patent: Aug. 8, 2000

[54] ADAPTIVE ANTENNA FOR USE IN SAME FREQUENCY NETWORKS

[75] Inventors: James A. Proctor, Jr., Indialantic; Kenneth M. Gainey, Satellite Beach, both of Fla.

[73] Assignee: Tantivy Communications Inc., Melbourne, Fla.

[21] Appl. No.: 09/210,117

[22] Filed: Dec. 11, 1998

Related U.S. Application Data

[63] Continuation of application No. 09/157,736, Sep. 21, 1998.

[51] Int. Cl.⁷ .................................................. H01Q 3/22
[52] U.S. Cl. ............................................ 342/368; 342/372
[58] Field of Search ................................ 342/154, 157, 342/368, 372

[56] References Cited

U.S. PATENT DOCUMENTS

| | | | |
|---|---|---|---|
| 4,170,766 | 10/1979 | Pridham et al. | 367/135 |
| 4,488,155 | 12/1984 | Wu | 343/376 |
| 5,038,149 | 8/1991 | Aubry et al. | 342/372 |
| 5,117,236 | 5/1992 | Chang et al. | 342/367 |
| 5,280,472 | 1/1994 | Gilhousen et al. | 370/18 |
| 5,303,240 | 4/1994 | Borras et al. | 370/95.3 |
| 5,430,452 | 7/1995 | Dubois | 342/368 |
| 5,437,055 | 7/1995 | Wheatley, III | 455/33.3 |
| 5,502,447 | 3/1996 | Kumpfbeck et al. | 342/373 |
| 5,592,178 | 1/1997 | Chang et al. | 342/372 |
| 5,617,102 | 4/1997 | Prater | 342/374 |
| 5,621,752 | 4/1997 | Antonio et al. | 375/200 |
| 5,634,199 | 5/1997 | Gerlach et al. | 455/63 |
| 5,680,142 | 10/1997 | Smith et al. | 342/372 |
| 5,739,784 | 4/1998 | Jan et al. | 342/354 |
| 5,943,362 | 8/1999 | Saito | 375/200 |

FOREIGN PATENT DOCUMENTS

| | | |
|---|---|---|
| 28 12 575 | 9/1979 | Germany . |
| 59050603 | 3/1984 | Japan . |

*Primary Examiner*—Thomas H. Tarcza
*Assistant Examiner*—Dao L. Phan
*Attorney, Agent, or Firm*—Hamilton, Brook, Smith & Reynolds, P.C.

[57] ABSTRACT

An antenna apparatus which can increase capacity in a cellular communication system. The antenna operates in conjunction with a mobile subscriber unit and provides a plurality of antenna elements, each coupled to a respective programmable phase shifter. The phase of each antenna element is programmed for optimum reception during, for example, an idle mode which receives a pilot signal. The antenna array creates a beamformer for signals to be transmitted from the mobile subscriber unit, and a directional receiving array to more optimally detect and receive signals transmitted from the base station. By directionally receiving and transmitting signals, multipath fading is greatly reduced as well as intercell interference. Various techniques for determining the proper phase of each antenna element are accommodated.

14 Claims, 8 Drawing Sheets

ADAPTIVE ANTENNA FOR USE IN SAME FREQUENCY NETWORKS

CROSS-REFERENCE TO RELATED APPLICATION

This application is a continuation of U.S. patent application Ser. No. 09/157,736 filed Sep. 21, 1998 entitled "Method and Apparatus Providing an Adaptive Antenna For Use in Same Frequency Networks," the entire teachings of which are incorporated herein by reference.

FIELD OF THE INVENTION

This invention relates to cellular communication systems, and more particularly to an antenna apparatus for use by mobile subscriber units to provide beamforming transmission and reception capabilities.

BACKGROUND OF THE INVENTION

Code Division Multiple Access (CDMA) communication systems may be used to provide wireless communication between a base station and one or more mobile subscriber units. The base station is typically a computer controlled set of transceivers that are interconnected to a land-based public switched telephone network (PSTN). The base station includes an antenna apparatus for sending forward link radio frequency signals to the mobile subscriber units. The base station antenna is also responsible for receiving reverse link radio frequency signals transmitted from each mobile unit. Each mobile subscriber unit also contains an antenna apparatus for the reception of the forward link signals and for transmission of the reverse links signals. A typical mobile subscriber unit is a digital cellular telephone handset or a personal computer coupled to a cellular modem. In CDMA cellular systems, multiple mobile subscriber units may transmit and receive signals on the same frequency but with different codes, to permit detection of signals on a per unit basis.

The most common type of antenna used to transmit and receive signals at a mobile subscriber unit is a mono- or omni-pole antenna. This type of antenna consists of a single wire or antenna element that is coupled to a transceiver within the subscriber unit. The transceiver receives reverse link signals to be transmitted from circuitry within the subscriber unit and modulates the signals onto the antenna element at a specific frequency assigned to that subscriber unit. Forward link signals received by the antenna element at a specific frequency are demodulated by the transceiver and supplied to processing circuitry within the subscriber unit.

The signal transmitted from a monopole antenna is omnidirectional in nature. That is, the signal is sent with the same signal strength in all directions in a generally horizontal plane. Reception of a signal with a monopole antenna element is likewise omnidirectional. A monopole antenna does not differentiate in its ability to detect a signal in one direction versus detection of the same or a different signal coming from another direction.

A second type of antenna which may be used by mobile subscriber units is described in U.S. Pat. No. 5,617,102. The system described therein provides a directional antenna comprising two antenna elements mounted on the outer case of a laptop computer. The system includes a phase shifter attached to the two elements. The phase shifter may be switched on or off in order to effect the phase of signals transmitted or received during communications to and from the computer. By switching the phase shifter on, the antenna transmit pattern may be adapted to a predetermined hemispherical pattern which provides transmit beam pattern areas having a concentrated signal strength or gain. The dual element antenna directs the signal into predetermined quadrants or hemispheres to allow for large changes in orientation relative to the base station while minimizing signal loss.

CDMA cellular systems are also recognized as being interference limited systems. That is, as more mobile subscriber units become active in a cell and in adjacent cells, frequency interference becomes greater and thus error rates increase. As error rates increase, maximum data rates decrease. Thus, another method by which data rate can be increased in a CDMA system is to decrease the number of active mobile subscriber units, thus clearing the airwaves of potential interference. For instance, to increase a current maximum available data rate by a factor of two, the number of active mobile subscriber units can be decreased by one half. However, this is rarely an effective mechanism to increase data rates due to a lack of priority amongst users.

SUMMARY OF THE INVENTION

Problems of the Prior Art

Various problems are inherent in prior art antennas used on mobile subscriber units in wireless communications systems. One such problem is called multipath fading. In multipath fading, a radio frequency signal transmitted from a sender (either base station or mobile subscriber unit) may encounter interference on route to an intended receiver. The signal may, for example, be reflected from objects such as buildings that are not in the direct path of transmission, but that redirect a reflected version of the original signal to the receiver. In such instances, the receiver receives two versions of the same radio signal; the original version and a reflected version. Since each received signal is at the same frequency but the reflected signal may be out of phase with the original due to reflection and a longer transmission path, the original and reflected signals may tend to cancel each other out. This results in fading or dropouts in the received signal, hence the term multipath fading.

Single element antennas are highly susceptible to multipath fading. A single element antenna has no way of determining the direction from which a transmitted signal is sent and cannot be tuned or attenuated to more accurately detect and receive a signal in any particular direction.

The dual element antenna described in the aforementioned reference is also susceptible to multipath fading, due to the symmetrical nature of the hemispherical lobes formed by the antenna pattern when the phase shifter is activated. Since the lobes created in the antenna pattern are more or less symmetrical and opposite from one another, a signal reflected in a reverse direction from its origin can be received with as much power as the original signal that is directly received. That is, if the original signal reflects from an object beyond or behind the intended receiver (with respect to the sender) and reflects back at the intended receiver from the opposite direction as the directly received signal, a phase difference in the two signals can create a multipath fading situation.

Another problem present in cellular communication systems is inter-cell interference. Most cellular systems are divided into individual cells, with each cell having a base station located at its center. The placement of each base station is arranged such that neighboring base stations are located at approximately sixty degree intervals from each other. In essence, each cell may be viewed as a six sided polygon with a base station at the center. The edges of each cell adjoin each other and many cells form a honeycomb like image if each cell edge were to be drawn as a line and all cells were viewed from above. The distance from the edge of a cell to its base station is typically driven by the maximum amount of power that is to be required to transmit an acceptable signal from a mobile subscriber unit located near the edge of a cell to that cell's base station (i.e., the power required to transmit an acceptable signal a distance equal to the radius of one cell).

Intercell interference occurs when a mobile subscriber unit near the edge of one cell transmits a signal that crosses over the edge of a neighboring cell and interferes with communications taking place within the neighboring cell. Typically, intercell interference occurs when similar frequencies are used for communication in neighboring cells. The problem of intercell interference is compounded by the fact that subscriber units near the edges of a cell typically use higher transmit powers so that the signals they transmit can be effectively received by the intended base station located at the cell center. Consider that another mobile subscriber unit located beyond or behind the intended receiver may be presented at the same power level, representing additional interference.

The intercell interference problem is exacerbated in CDMA systems, since the subscriber units in adjacent cells may typically be transmitting on the same frequency. What is needed is a way to reduce the subscriber unit antenna's apparent field of view, which can have a marked effect on the operation of the forward link (base to subscriber) by reducing the apparent number of interfering transmissions. A similar improvement is needed for the reverse link, so that the transmitted signal power needed to achieve a particular receive signal quality could be reduced.

BRIEF DESCRIPTION OF THE PRESENT INVENTION

The present invention provides an inexpensive antenna apparatus for use with a mobile subscriber unit in a wireless same frequency communication system, such as a CDMA cellular communication system.

The invention provides a precise mechanism for determining in which direction the base station assigned to that unit is located and provides a means for configuring the antenna apparatus to maximize the effective radiated and/or received energy. The antenna apparatus includes multiple antenna elements and a like number of adjustable phase shifters, each respectively coupled to one of the antenna elements. The phase shifters are independently adjustable (i.e., programmable) to affect the phase of respective reverse link signals to be transmitted from the subscriber unit on each of the antenna elements.

A summation circuit is also coupled to each phase shifter and provides respective reverse link signals from the subscriber unit to each of the phase shifters for transmission from the subscriber unit. The summation circuit also receives and combines the respective forward link signals from each of the phase shifters into one received forward link signal provided to the subscriber unit.

The phase shifters are also independently adjustable to affect the phase of the forward link signals received at the subscriber unit on each of the antenna elements. By adjusting phase for forward link signals, the antenna apparatus provides rejection of signals that are received and that are not transmitted from a similar direction as are the forward link signals intended for the subscriber unit.

To allow the antenna apparatus to adapt to various orientations with respect to the base station, the antenna apparatus also includes a controller coupled to each of the adjustable phase shifters. The controller determines an optimal phase setting for each phase shifter. The proper phase of each element may, for example, be determined by monitoring an optimum response to pilot signal transmitted from the base station. The antenna apparatus thus acts as a beamformer for transmission of signals from the subscriber unit and acts as a directive antenna for signals received by the subscriber unit.

Through the use of an array of antenna elements each having a programmable phase, the antenna apparatus is estimated to increase the effective transmit power per bit transmitted by as much as 9 decibels (dB) for reverse link communications. Thus, the number of active subscriber units in a cell may remain the same while the antenna apparatus of this invention increases data rates for each subscriber unit beyond those achievable by prior art antennas. Alternatively, if data rates are maintained at a given rate, more subscriber units may become active in a single cell using the antenna apparatus described herein. In either case, the capacity of a cell is increased, as measured by the sum total of data being communicated at any moment in time.

Forward link communication capacity can be increased as well, due to the directional reception capabilities of the antenna apparatus. Since the antenna apparatus is less susceptible to interference from adjacent cells, the forward link capacity can be increased by adding more users or by increasing cell radius size.

With respect to the physical implementation of the antenna apparatus, one embodiment of the invention specifies that first, second, and third antenna elements are positioned at locations corresponding to corners of an equilateral triangle and are aligned orthogonal to a place defined by the triangle. Other embodiments specify that first, second, third, fourth and fifth antenna elements are positioned at locations corresponding to corners of a square, with the fifth antenna element positioned at a location corresponding to a center of the square.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

Figure 1:
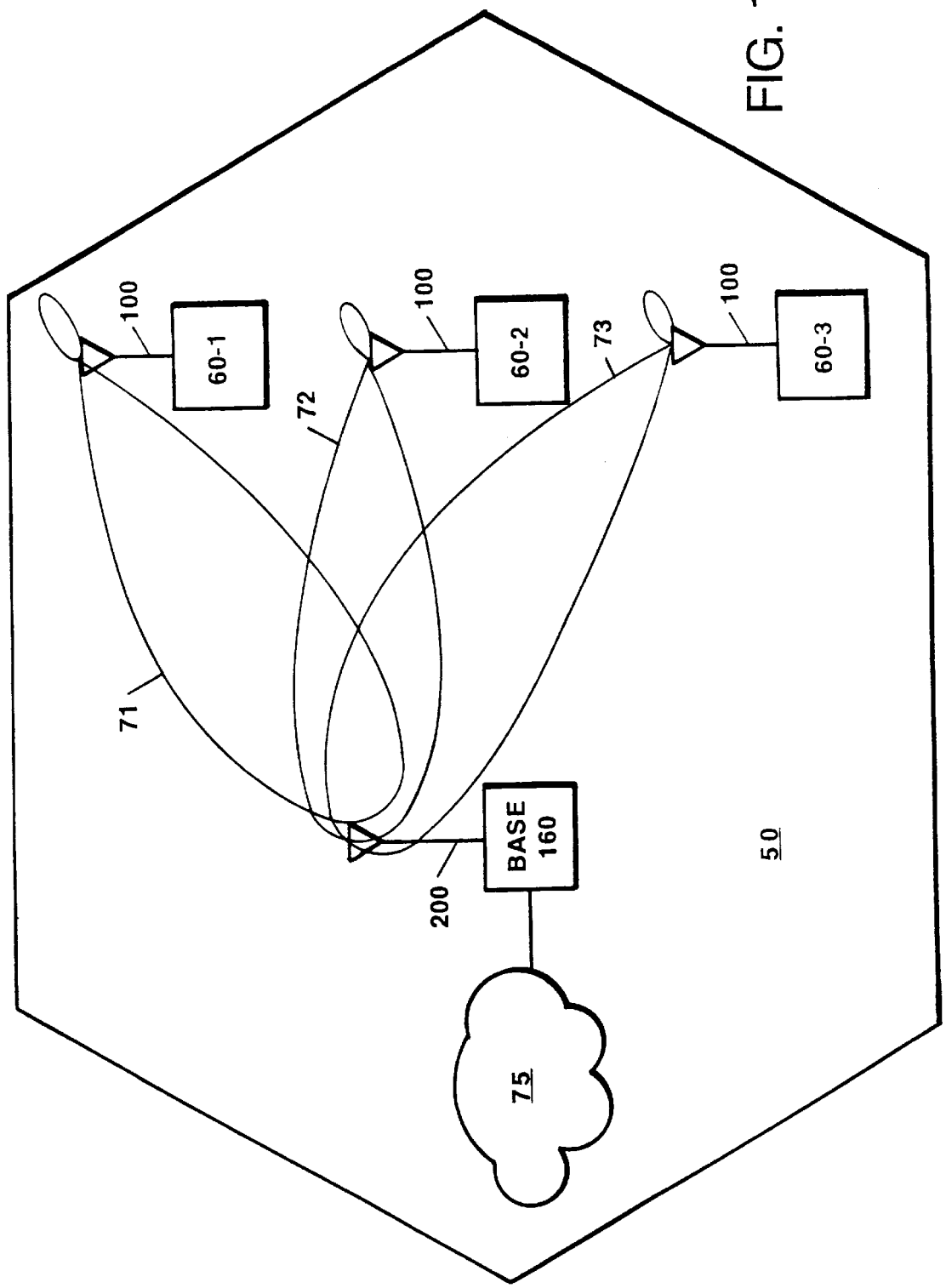
FIG. 1 illustrates a cell of a CDMA cellular communications system.

FIG. 1 illustrates one cell 50 of a typical CDMA cellular communication system. The cell 50 represents a geographical area in which mobile subscriber units 60-1 through 60-3 communicate with centrally located base station 160. Each subscriber unit 60 is equipped with an antenna 100 configured according to this invention. The subscriber units 60 provide wireless data and/or voice services and can connect devices such as, for example, laptop computers, portable computers, personal digital assistants (PDAs) or the like through base station 160 to a network 75 which can be a Public Switched Telephone Network (PSTN), a packet switched computer network, or other data network such as the Internet or a private intranet. The base station 160 may communicate with the network 75 over any number of different efficient communication protocols such as primary rate ISDN, or other LAPD based protocols such as IS-634 or V5.2, or even TCP/IP if network 75 is an Ethernet network such as the Internet. The subscriber units 101 may be mobile in nature and may travel from one location to another while communicating with base station 104.

FIG. 1 illustrates one base station 160 and three mobile subscriber units 60 in cell 50 by way of example only and for ease of description of the invention. The invention is applicable to systems in which there are typically many more subscriber units communicating with one or more base stations in an individual cell, such as cell 50.

It is also to be understood by those skilled in the art that FIG. 1 may be a standard cellular type communication system such as a CDMA, TDMA, GSM or other system in which the radio channels are assigned to carry data and/or voice or between the base stations 104 and subscriber units 101. In a preferred embodiment, FIG. 1 is a CDMA-like system, using code division multiplexing principles such as those defined in the IS-95B standards for the air interface.

The invention provides the mobile subscriber units 60 with an antenna 100 that provides directional reception of forward link radio signals transmitted from base station 160, as well as providing directional transmission of reverse link signals, via a process called beamforming, from the mobile subscriber units 60 to the base station 160. This concept is illustrated in FIG. 1 by the example beam patterns 71 through 73 which extend outwardly from each mobile subscriber unit 60 more or less in a direction for best propagation towards the base station 160. By being able to direct transmission more or less towards the base station 160, and by being able to directively receive signals originating more or less from the location of the base station 160, the antenna apparatus 100 reduces the effects of intercell interference and multipath fading for mobile subscriber units 60. Moreover, since the transmission beam patterns 71, 72 and 73 are extended outward in the direction of the base station 160 but are attenuated in most other directions, less power is required for transmission of effective communication signals from the mobile subscriber units 60-1, 60-2 and 60-3 to the base station 160.

Figure 2:
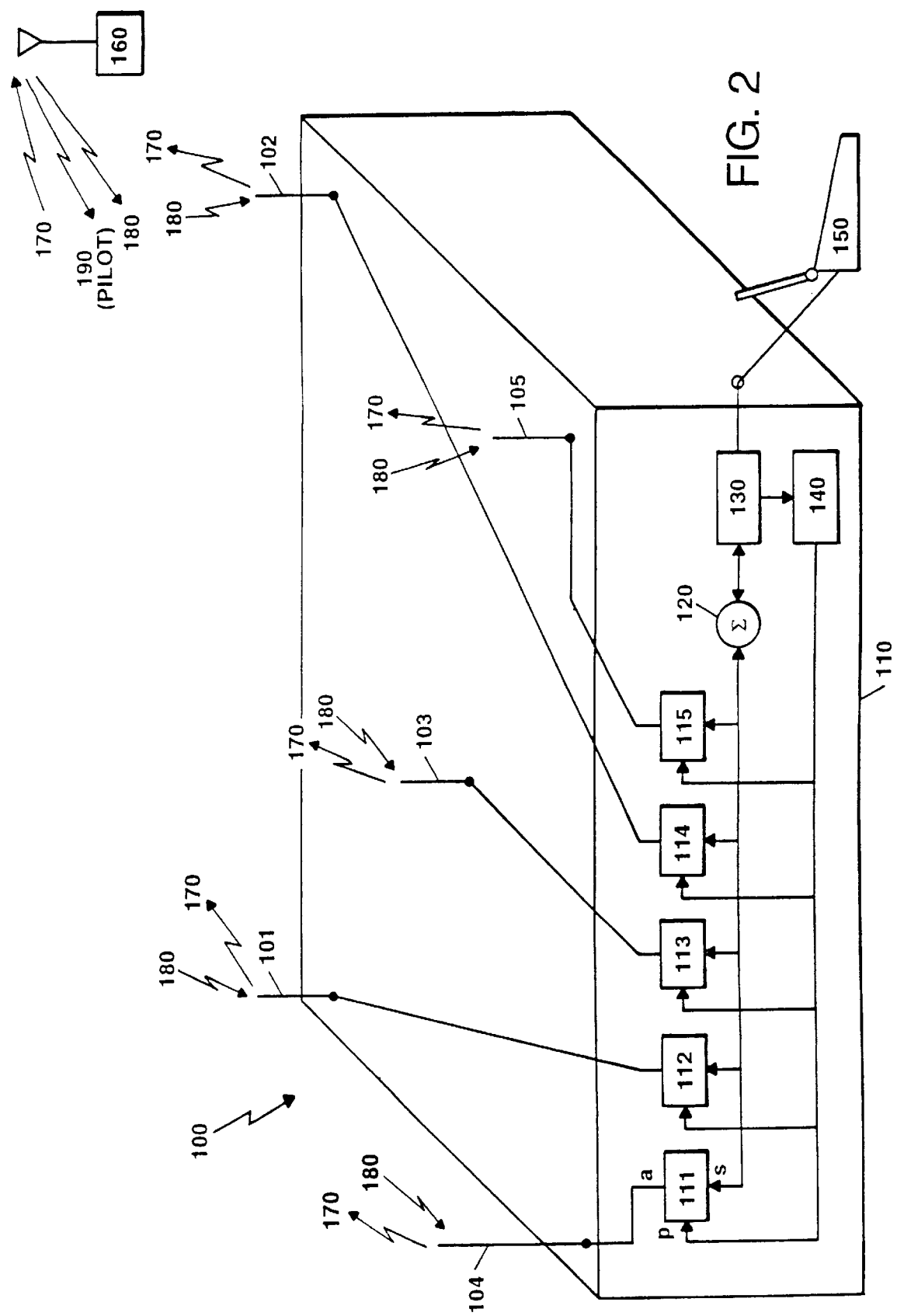
FIG. 2 illustrates a preferred configuration of an antenna apparatus used by a mobile subscriber unit in a cellular system according to this invention.

FIG. 2 illustrates a detailed isometric view of a mobile subscriber unit 60 and an associated antenna apparatus 100 configured according to the present invention. Antenna apparatus 100 includes a platform or housing 110 upon which are mounted five antenna elements 101 through 105. Within housing 110, the antenna apparatus 100 includes phase shifters 111 through 115, a bi-directional summation network or splitter/combiner 120, transceiver 130, and control processor 140 which are all interconnected via bus 135. As illustrated, the antenna apparatus 100 is coupled via the transceiver 130 to a laptop computer 150 (not drawn to scale). The antenna 100 allows the laptop computer 150 to perform wireless data communications via forward link signals 180 transmitted from base station 160 and reverse link signals 170 transmitted to base station 160.

In a preferred embodiment, each antenna element 101 through 105 is disposed on the surface of the housing 110 as illustrated in the figure. In this preferred embodiment, four elements 101, 102, 104 and 105 are respectively positioned at locations corresponding to corners of a square, and a fifth antenna element 103 is positioned at a location corresponding to a center of the square. The distance between each element 101 through 105 is great enough so that the phase relationship between a signal received by more than one element 101 through 105 will be somewhat out of phase with other elements that also receive the same signal, assuming all elements 101 through 105 have the same phase setting as determine by phase shifters 111 through 115. That is, if the phase setting of each element 101 through 105 were the same, each element 101 through 105 would receive the signal somewhat out of phase with the other elements.

However, according to the operation of the antenna 100 in this invention, the phase shifters 111 through 115 are independently adjustable to affect the directionality of signals to be transmitted and/or received to or from the subscriber unit (i.e., laptop computer 150 in this example). By properly adjusting the phase for each element 101 through 105, during signal transmission, a composite beam is formed which may be positionally directed towards the base station 160. That is, the optimal phase setting for sending a reverse link signal 170 from the antenna 100 is a phase setting for each antenna element 101 through 105 that creates a directional reverse link signal beamformer. The result is an antenna 100 which directs a stronger reverse link signal pattern in the direction of the intended receiver base station 160.

The phase settings used for transmission also cause the elements 101 to 105 to optimally receive forward link signals 180 that are transmitted from the base station 160. Due to the programmable nature and the independent phase setting of each element 101 through 105, only forward link signals 180 arriving from a direction that is more or less in the location of the base station 160 are optimally received. The elements 101 through 105 naturally reject other signals that are not transmitted from a similar location as are the forward link signals. In other words, a directional antenna is formed by independently adjusting the phase of each element 101 through 105.

The summation network 120 is coupled to the signal terminal 15, of each phase shifter 111 through 115. During transmission, the summation network 120 provides respective reverse link signals to be transmitted by each of the phase shifters 111 through 115. The phase shifters 111 through 115 shift the phase of the reverse link signal by a phase setting associated with that particular phase shifter 111 through 115, respectively, as set by a phase shift control input, p. By shifting the phase of the transmitted reverse link signals 170 from each element 101 through 105, certain portions of the transmitted signal 170 that propagates from each element 101 through 105 will be more in phase with other portions of other signals 170 from other elements 101 through 105. In this manner, the portions of signals that are more in phase with each other will combine to form a strong composite beam for the reverse link signals 170. The amount of phase shift provided to each antenna element 101 through 105 determines the direction in which the stronger composite beam will be transmitted.

The phase settings used for transmission from each element 101 through 105, as noted above, provide a similar physical effect on a forward link frequency signal 180 that is received from the base station 160. That is, as each element 101 through 105 receives a signal 180 from the base station 160, the respective received signals will initially be out of phase with each other due to the location of each element 101 through 105 upon base 110. However, each received signal is phase-adjusted by the phase shifters 111 through 115. The adjustment brings each signal in phase with the other received signals 180. Accordingly, when each signal is summed by the summation network 120, the composite received signal will be accurate and strong.

To optimally set the phase shift for each phase shifter 111 through 115 in antenna 100, phase control values are provided by the controller 140. Generally, in the preferred embodiment, the controller 140 determines these optimum phase settings during idle periods when laptop computer 150 is neither transmitting nor receiving data via antenna 100. During this time, a received signal, for example, a forward link pilot signal 190, that is continuously sent from base station 160 and that is received on each antenna element 101 through 105. That is, during idle periods, the phase shifters 111 through 115 are adjusted to optimize reception of the pilot signal 190 from base station 160, such as by maximizing the received signal energy or other link quality metric.

The processor 140 thus determines an optimal phase setting for each antenna element 101 through 105 based on an optimized reception of a current pilot signal 190. The processor 140 then provides and sets the optimal phase for each adjustable phase shifter 111 through 115. When the antenna 100 enters an active mode for transmission or reception of signals between the base station 160 and the laptop 150, the phase setting of each phase shifter 111 through 115 remains as set during the previous idle time period.

Before a detailed description of phase setting computation as performed by the processor 140 is given, it should be understood that the invention is based in part on the observation that the location of the base station 160 in relation to any one mobile subscriber unit (i.e., laptop 150) is approximately circumferential in nature. That is, if a circle were drawn around a mobile subscriber unit and different locations are assumed to have a minimum of one degree of granularity between any two locations, the base station 160 can be located at any of a number of different possible angular locations. Assuming accuracy to one degree, for example, there are 360 different possible phase setting combinations that exist for an antenna 100. Each phase setting combination can be thought of as a set of five phase shift values, one for each antenna element 101 through 105.

There are, in general, at least two different approaches to finding the optimized phase shift values. In the first approach, the controller 140 performs a type of optimized search in which all possible phase setting combinations are tried. For each phase setting (in this case, for each one of the 360 angular settings), five precalculated phase values are read, such as from memory storage locations in the controller 140, and then applied to the respective phase shifters 111 through 115. The response of the receiver 130 is then detected by the controller 140. After testing all possible angles, the one having the best recover response, such as measured by maximum signal to noise ratio (the ratio of energy per bit, $E_b$, or energy per chip, $E_c$, to total interference, $I_o$).

In a second approach, each phase shift value is individually determined by allowing it to vary while the other phase values are held constant. This perturbational approach iteratively arrives at an optimum value for each of the five phase settings.

Figure 3:
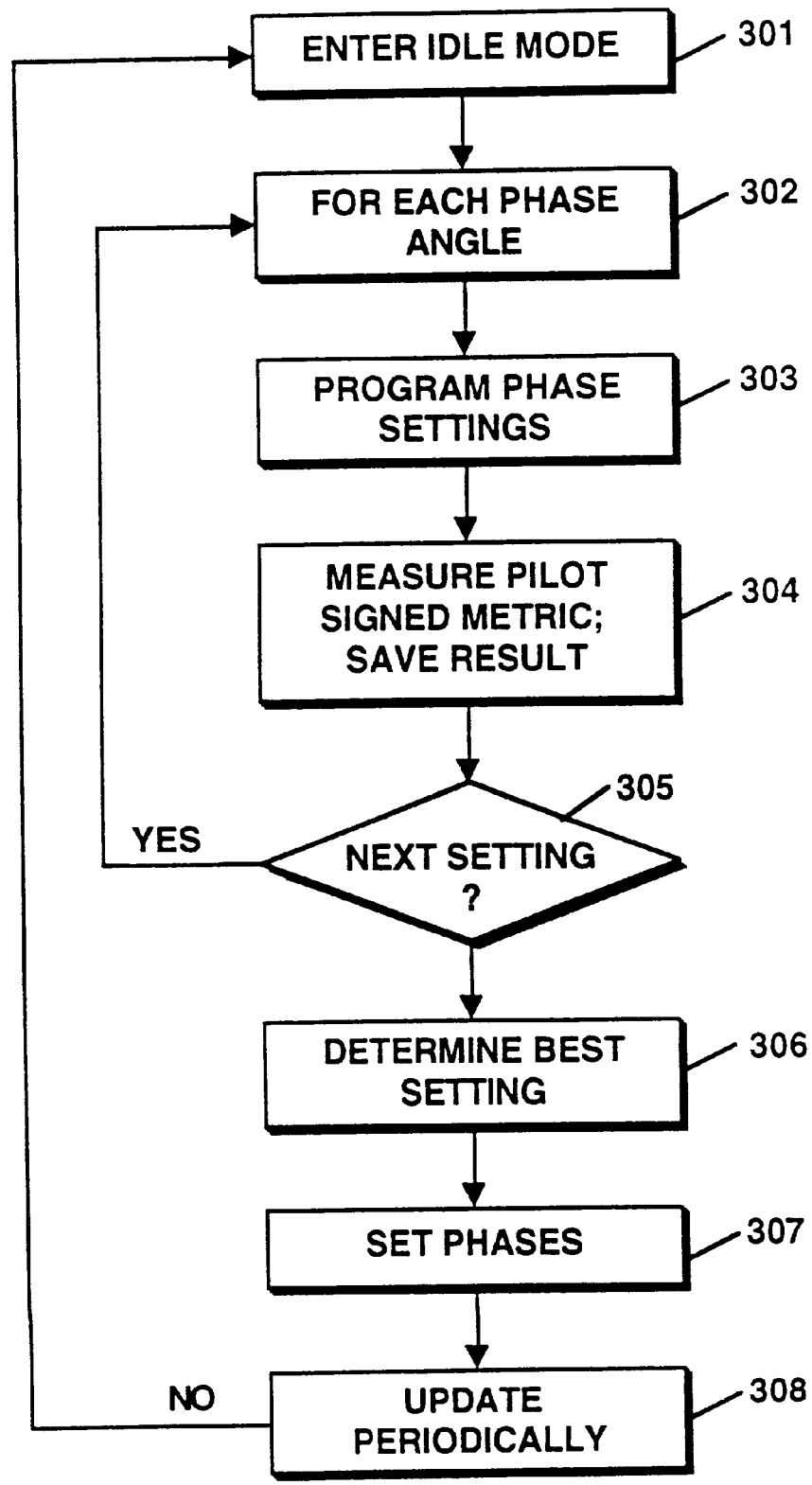
FIG. 3 is a flow chart of the processing steps performed to optimally set the phase of each antenna element.

FIG. 3 shows steps 301 through 306 performed by the controller 140 according to one embodiment of the invention. In order to determine the optimal phase settings for phase shifters 111 through 115 by the first "search" method, steps 301 through 306 are performed during idle periods of data reception or transmission, such as when a pilot signal 190 is being transmitted by the base station 160.

In step 301, the controller 140 determines that the idle mode has been entered, such as by detecting certain forward link signals 180. Step 302 then begins a loop that will execute once for each possible angle or location at which the base station 160 may be located. In the preferred embodiment, this loop is executed 360 times. Step 303 then programs each phase shifter 111 through 115 with a phase setting corresponding to the first location (i.e., angle 0) setting. The phase settings may, for example, be precalculated and stored in a table, with five phase shift setting for each possible angle corresponding to the five elements of the array. In other words, step 303 programs phase settings for a first angle, which may be conceptualized as angle 0 in a 360 degree circle surrounding the mobile subscriber unit 60. Step 304 then measures the received pilot signal 190, as output from the summation network 120. The measurement in step 304 reflects how well each antenna element 101 through 105 detected the receive pilot signal 190 based upon the current set of programmed phase settings applied in step 303. Step 304 saves the measurement as a received signal metric value. The metric may, for example, be a link quality metric as bit error rate or noise energy level per chip ($E_c/N_o$).

Step 305 then returns processing to step 302 to program the phase shifters for the next set of phase settings. Steps 302 through 305 repeat until all 360 sets of phase settings have been programmed into phase shifters 111 through 115 (step 303) and a measurement has been taken of the received pilot signal 190 for each of these settings (Step 304). After step 305 determines there are no more set of phase settings, step 306 determines the best set of phase settings as determined by which settings produced the strongest receive signal metric value. Step 307 then programs the phase shifters 111 through 115 with the set of phase settings that was determined to produce this best result.

During long periods of idle time, step 308 is executed which repeats the process periodically. Step 308 accounts for the fact that the antenna 100 might be moved and re-oriented during idle periods, thus affecting the direction and orientation of the base station in relation to the antenna 100.

In addition, the antenna may be optimized during transmission.

In this manner, steps 301 through 308 continuously update and set optimal phase setting for each antenna element 101 through 105.

Figure 4:
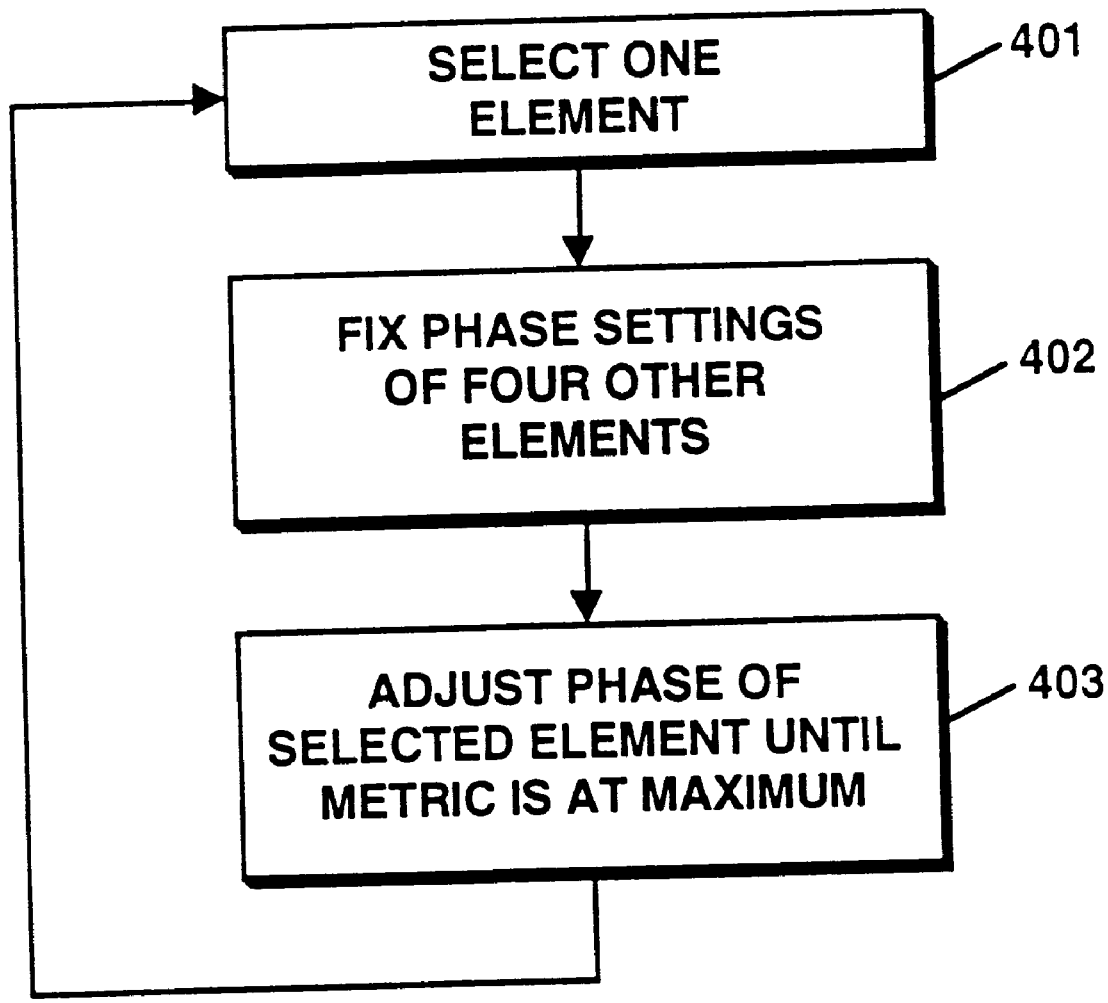
FIG. 4 is a flow chart of steps performed by a perturbational algorithm to optimally determine the phase settings of antenna elements.

FIG. 4 shows processing steps for an alternative method for determining the optimal phase setting of antenna elements 101 through 105 is to use a perturbational algorithm. Generally, this method uses a perturbational algorithm to determine phase settings in the form of weights for each antenna element 101 through 105.

In step 400, one of the antenna elements 101 through 105 is selected. In step 402, the phase settings of the four remaining elements not selected in step 400 are fixed in value. Step 403 then varies the phase setting of the non-fixed element selected in step 401 until the setting which maximizes the pilot signal metric is determined. Then, the process repeats by returning to step 401 where the previously selected element is fixed to this optimum phase and the phase setting of one of the other elements is varied. The process continues until each element is configured with an optimal setting. As the process iterates, the phase settings of each element converge to an optimum setting.

Figure 5:
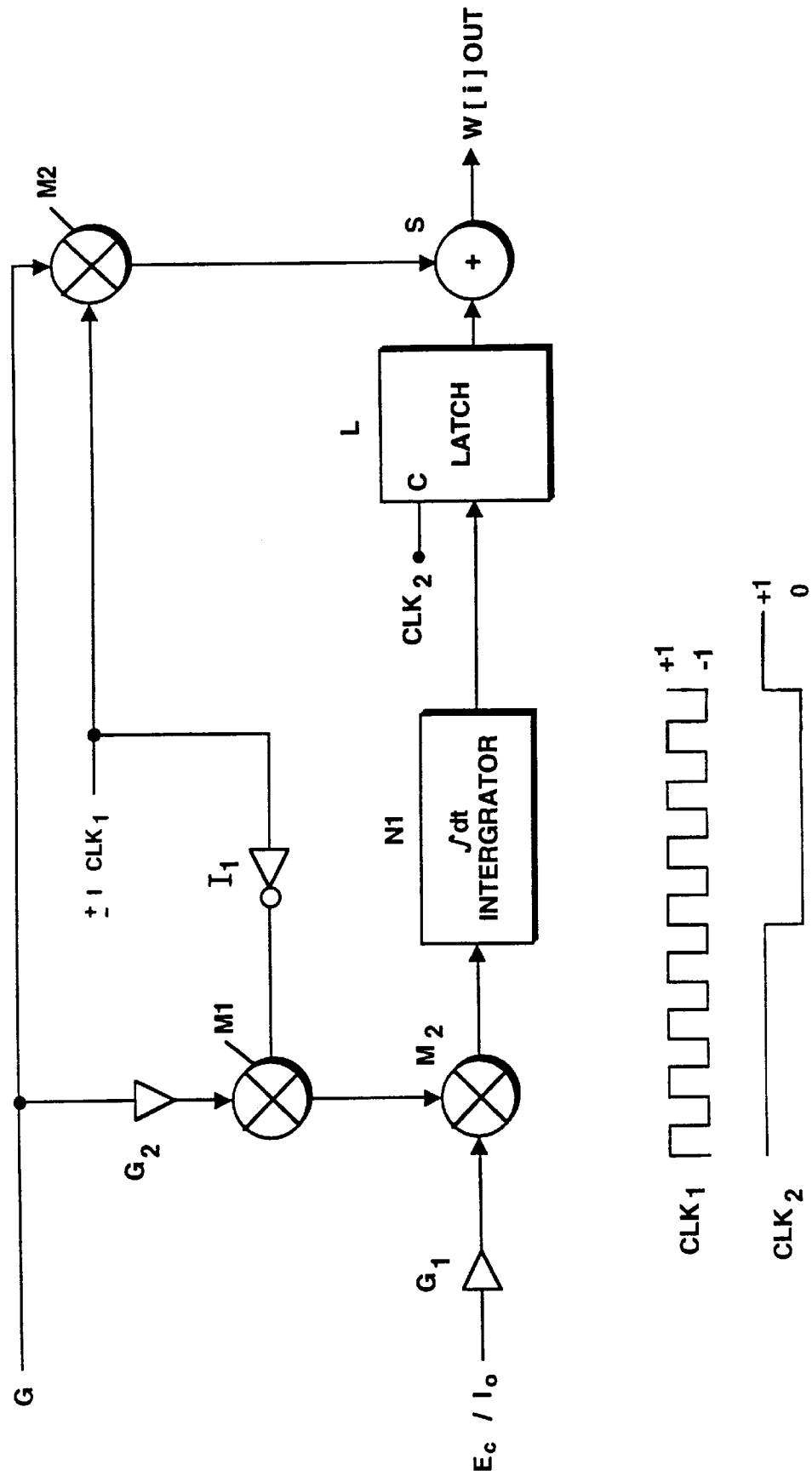
FIG. 5 illustrates flow diagram for a perturbational computational algorithm for computing the phase weights to be assigned to each antenna element.

FIG. 5 illustrates a more detailed flow diagram for implementing a perturbational algorithm to determine optimal phase settings for each antenna element. The flow diagram in FIG. 5 may be used in place of the processing steps performed by the controller 140 in FIG. 3.

The algorithm fixes a value for four of the five unknown, optimum phase shifts W[i], e.g. W[2] through W[5]. The algorithm perturbs the system and observes the response, adapting to find the optimum value for the unfixed phase value, e.g. W[1]. The measured link quality metric, in this case $E_c/I_o$, is fed to a first gain block $G_1$. Again input G is fed to a second gain block $G_2$. A first fast "clock" date value, CLK1, which alternates from a value of "1" to a value of "−1" is inverted by I1 and fed to a first multiplier M1. The other input of multiplier M1 is fed by the gain block $G_2$.

The output of m1 is fed to a second multiplier M2 together with the output of G1. An integrator N1 measures an average level and provides this to the latch L. A slow clock CLK2, typically alternating at a rate which varies between "1" and "0" and is much slower than CLK1, by at least 100 times, drives the latch "clock" C. The ouput of the latch L is summed by summation block S with the non-inverted output of M2. The result, W[i], is a value which tends to seek a localized minima of the function.

The process shown in FIG. 5 is then repeated by setting the first unfixed phase value W[1] to the derived value, setting W[3] to W[5] to a fixed value and letting w[2] be the output of this process. The process continues to find optimum values for each of the five unknown phase values.

Alternatively, instead of varying a phase assigned to each antenna element 101 through 105, the phase setting for each element can be stored in a table of vectors, each vector having assignments for the five elements 101 through 105. The five values in each vector can be computed based upon the angle of arrival of the receive pilot signal. That is, the values for each antenna element are set according to the direction in which the base station is located in relation to the mobile subscriber unit. The angle of arrival can be used as a value to lookup the proper vector of weights (and/or phase settings) in the table. By using a table with vectors, only the single angle of arrival calculation needs to be performed to properly set the phase settings of each element 101 through 105.

Figure 6A:
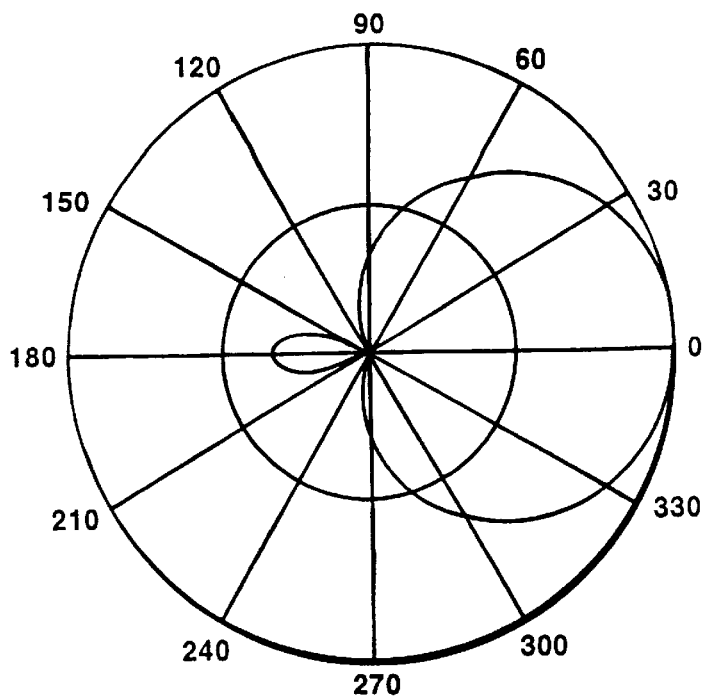
FIG. 6a is a graph of a beam pattern directed to zero degrees East by an antenna configured according to the invention.

FIG. 6a is a graph of a model of a beam pattern which obtained via an optimal phase setting directed towards a base station located at position corresponding to zero degrees (i.e., to the right of the figure). As illustrated in FIG. 6a, the invention provides a directed signals that helps to avoid the problems of multipath fading and intercell interference.

Figure 6B:
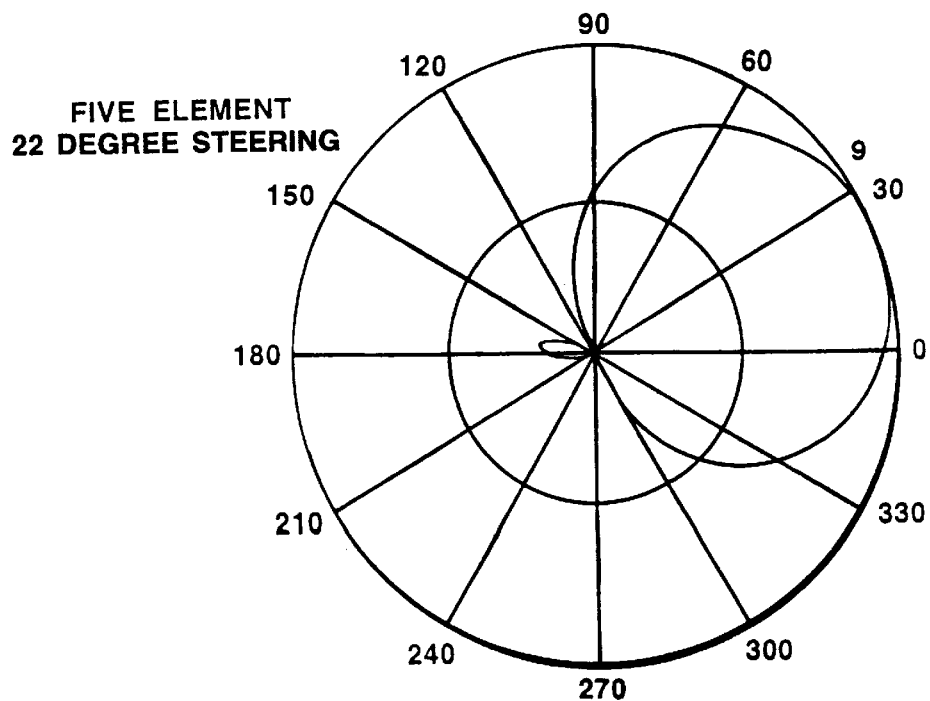
FIG. 6b is a graph of a beam pattern directed to twenty two degrees East by an antenna configured according to the invention.

FIG. 6b is a graph of another beam pattern model obtained by steering the beam twenty-two degrees north east upon detection of movement of the mobile subscriber unit. As illustrated, by adjusting the phase of each element 101 through 105, the beam may be steered to an optimal position for transmission and for reception of radio signals.

Figure 6C:
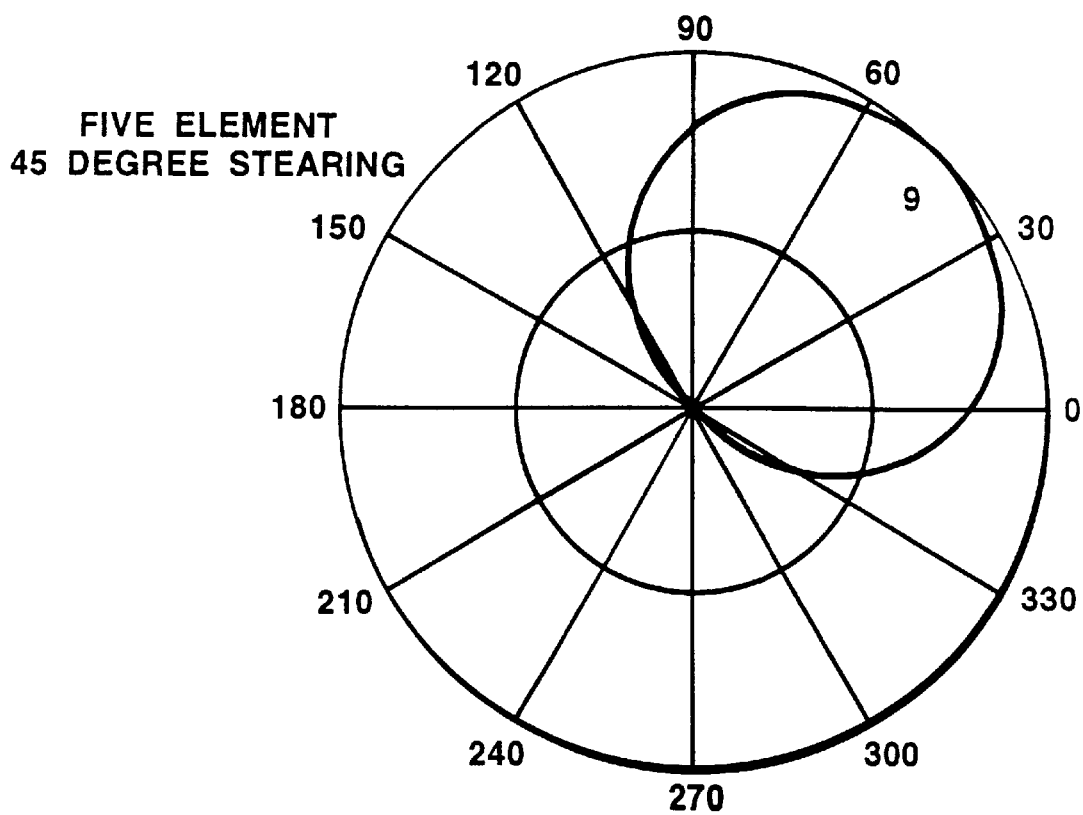
FIG. 6c is a graph of a beam pattern directed to forty five degrees Northeast by an antenna configured according to the invention.

FIG. 6c is a graph of another beam pattern model obtained by steering the beam twenty-two degrees north east upon detection of movement of the mobile subscriber unit.

Figure 6D:
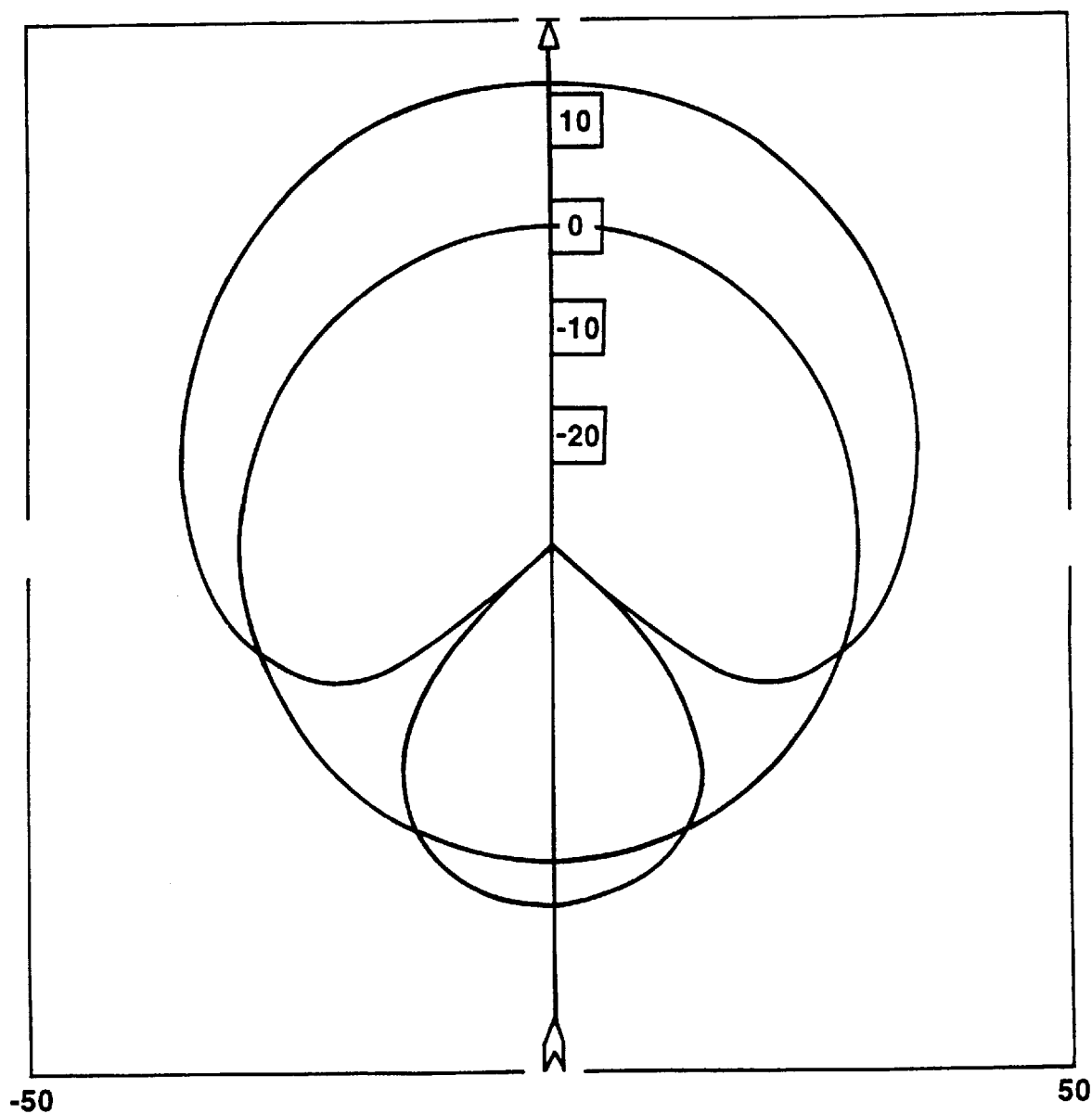
FIG. 6d is a graph of beam strength for an antenna configured according to the invention which shows a 9 decibel increase in gain.

FIG. 6d is a graph of the power gain obtained from the antenna apparatus 100 as compared to the power gain obtained from an omni-directional single element antenna as used in the prior art. As shown, the invention provides a significant increase is the directed power signal by increasing the signal by 9 dB over prior art signal strengths using omnipole antennas.

The antenna apparatus in preferred embodiments of the invention is inexpensive to construct and greatly increases the capacity in a CDMA interference limited system. That is, the number of active subscriber units within a single cell in a CDMA system is limited in part by the number of frequencies available for use and by signal interference limitations that occur as the number of frequencies in use increases. As more frequencies become active within a single cell, interference imposes maximum limitations on the number of users who can effectively communicate with the base station. Intercell interference also contributes as a limiting factor is cell capacity.

Since this invention helps to eliminate interference from adjacent cells and selectively directs transmission and reception of signals from each mobile unit equipped with the invention to and from the base station, an increase in the number of users per cell is realized.

Moreover, the invention reduces the required transmit power for each mobile subscriber unit by providing an extended directed beam towards the base station.

Alternative physical embodiments of the antenna include a four element antenna wherein three of the elements are positioned at corners of an equilateral triangular plane and are arranged orthogonally and extend outward from that plane. The fourth element is similarly situated but is located in the center of the triangle.

While this invention has been particularly shown and described with references to preferred ed by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. For example, there can be alternative mechanisms to determining the proper phase for each element, such as storing phase setting values in a linked list or a database instead of a table. Moreover, those skilled in the art of radio frequency measurement understand there are various ways to detect the origination of a signal such as the receive pilot signal. These mechanisms for determining the location of signal origination are meant to be contemplated for use by this invention. Once the location is then known, the proper phase setting for elements may be performed. Such equivalents are intended to be encompassed in the scope of the claims.

What is claimed is:

1. An antenna apparatus for use with a subscriber unit in a wireless communication system, the antenna apparatus comprising:

a plurality of antenna elements;

a like plurality of adjustable phase shifters, each respectively coupled to one of the antenna elements;

the phase shifters being independently adjustable to affect the phase of respective reverse link signals to be transmitted from the subscriber unit on each of the antenna elements, to form a composite beam which may be positionally directed towards a base station; and wherein an optimal phase setting for each of the phase shifters is determined from parameters of a received pilot signal transmitted from the base station.

2. The antenna apparatus of claim 1, wherein the optimal phase setting is a phase setting for each of the antenna elements such that upon transmission of reverse link signals from the subscriber unit, a directional reverse link signal beam is formed via the antenna elements to reduce emission in a direction of other receivers not intended to receive the reverse link signal.

3. The antenna apparatus of claim 1, wherein the optimal phase is set for each of the antenna elements such that signal power to interference ratio is maximized.

4. The antenna apparatus of claim 1, wherein the optimal phase setting is set for each of the antenna elements such that bit error rate is minimized.

5. The antenna apparatus of claim 1, wherein the optimal phase is a phase setting for each of the antenna elements such that upon reception of a forward link signal at the subscriber unit, a directional receiving antenna is created from the antenna elements to detect a forward link signal pattern sent from the direction of an intended transmitter and to suppress detection of a signal pattern received from a direction other than the direction of the intended transmitter.

6. The antenna apparatus of claim 1, wherein the optimal phase is a phase setting for each of the antenna elements such that upon reception of a forward link signal at the subscriber unit, a directional receiving antenna is created from the antenna elements to detect a forward link signal pattern sent from the direction of an intended transmitter and to suppress detection of a signal pattern received from a direction other than the direction of the intended transmitter.

7. The apparatus of claim 1, further including:

first, second, third, fourth, and fifth antenna elements;

first, second, third, fourth, and fifth adjustable phase shifters, each respectively coupled to the forth and fifth antenna elements to transmit and receive signals therefrom;

the fourth and fifth phase shifters also being independently adjustable to affect the phase of respective reverse link signals to be transmitted from the subscriber unit on each of the fourth and fifth antenna elements, thus allowing low transmit power to be used in the subscriber unit due to directional beamforming that occurs caused by phase adjustments of signals to be transmitted from the first, second, third, fourth, and fifth antenna elements.

8. The antenna apparatus of claim 7 wherein the first, second, third, fourth, and fifth adjustable phase shifters are independently adjustable to affect the phase of respective forward link signals received at the subscriber unit on each of the first, second, third, fourth, and fifth antenna elements thus providing rejection of signals that are received and that are not transmitted from a similar location as are the forward link signals intended for the subscriber unit.

9. The antenna apparatus of claim 7, wherein the first, second, third, and fourth antenna elements are positioned at locations corresponding to corners of a square, and the fifth antenna element is positioned at a location corresponding to a center of the square.

10. The antenna apparatus of claim 1 wherein the phase shifters are independently adjustable to affect the phase of respective forward link signals received at the subscriber unit at each of the antenna elements thus providing rejection of signals that are received and that are not transmitted from the same direction as are the base station which transmits the forward link signals intended for the subscriber unit.

11. The antenna apparatus of claim 1 further comprising a summation network coupled to the phase shifters, the summation network providing the respective reverse link signals from the subscriber unit to each of the phase shifters for transmission from the subscriber unit, and the summation network receiving and combining the respective forward link signals from each of the phase shifters into one received forward link signal provided to the subscriber unit.

12. The antenna apparatus of claim 1 in which multiple subscriber units transmit code division multiple access signals on a common carrier frequency.

13. The antenna apparatus of claim 12 wherein the code division multiple access signals are transmitted within a cell, each cell containing a base station and a plurality of mobile units, each mobile unit attached to an antenna apparatus.

14. The antenna apparatus of claim 1 comprising a system for providing wireless communications among a plurality of subscribers using spread spectrum signaling for transmission of a plurality of desired traffic signals from a subscriber unit to a base station unit on a common carrier frequency within a defined transmission region.

* * * * *